United States Patent [19]

Kozakai

[11] Patent Number: 5,096,991
[45] Date of Patent: Mar. 17, 1992

[54] ORGANOPOLYSILOXANE POLYMERS AND METHOD FOR MAKING

[75] Inventor: Shohei Kozakai, Annaka, Japan
[73] Assignee: Shin-Etsu Chemical Co., Ltd., Tokyo, Japan
[21] Appl. No.: 550,525
[22] Filed: Jul. 10, 1990
[30] Foreign Application Priority Data

Jul. 14, 1989 [JP] Japan .................. 1-181921

[51] Int. Cl.$^5$ ............................................ C08G 77/04
[52] U.S. Cl. ........................ 528/25; 528/29; 528/35
[58] Field of Search ................ 528/25, 29, 35

[56] References Cited

U.S. PATENT DOCUMENTS 3,293,211  12/1966  Krimm et al. ............ 528/35
4,233,427  11/1980  Bargain et al. ............ 528/35

OTHER PUBLICATIONS

R. L. Merker et al., Journ. of Polymer Science Part A, vol. 2, pp. 31–44 (1964).
Rosenberg & Choe, Abstracts of Papers, 172nd Nat. Meeting; Am. Chem. Soc., (8/76), pp. 239–247.
Merker and Scott, Journ. of Polym. Science, Part A, vol. 2, pp. 15–29 (1964).

*Primary Examiner*—Melvyn I. Marquis
*Attorney, Agent, or Firm*—Birch, Stewart, Kolasch & Birch

[57] ABSTRACT

An organopolysiloxane homopolymer or copolymer comprising recurring units of the general formula:

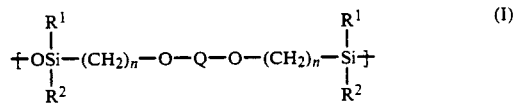

wherein $R^1$ and $R^2$ are independently selected from monovalent hydrocarbon groups, Q is a divalent aromatic hydrocarbon group, and letter n is an integer of from 1 to 4 has a high melting point and a high glass transition temperature and cures into products having a high modulus of elasticity and mechanical strength and thus suitable for various industrial applications. The polymer is prepared by a simple method involving the steps of reacting an alkali metal salt of a dihydroxy aromatic compound with a halogenated alkyl diorganoalkoxysilane, hydrolyzing the resulting bis(alkoxysilylalkoxy)arylene compound, and polycondensing the resulting bis(hydroxysilylalkoxy)arylene compound.

5 Claims, No Drawings

ORGANOPOLYSILOXANE POLYMERS AND METHOD FOR MAKING

This invention relates to organopolysiloxane homopolymers and copolymers having a high melting point and a high glass transition temperature which can be cured into products having a high modulus of elasticity and mechanical strength and being suitable for various industrial applications. It also relates to a method for preparing the polymers.

BACKGROUND OF THE INVENTION

Heretofore, organopolysiloxanes, especially dimethylpolysiloxanes have been utilized in fluid or cured form in a wide variety of industrial settings including electric, electronic, automobile, machinery, and building industries. However, as a result of the characteristics (low melting point, low glass transition temperature, and low van der Waals forces) of the base polymer or dimethylpolysiloxane thereof, these cured products are rubbery elastomers which only find a limited range of application because of their low modulus of elasticity and mechanical strength.

It was reported that organopolysiloxanes capable of forming cured products having a high melting point and a high modulus of elasticity can be obtained by introducing a divalent aromatic hydrocarbon group such as a phenylene group into the backbone of organopolysiloxanes. Based on this teaching, the following organopolysiloxanes were proposed.

(1) Polysilphenylenesiloxane

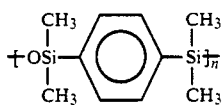

See R. L. Merker, M. J. Scott, and G. G. Habeland; Journal of Polymer Science, Part A, Vol. 2, page 31 (1964).

(2) Poly(m-silxylenesiloxane)

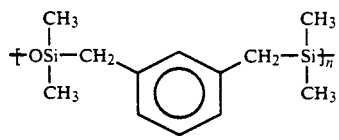

See H. Rosenberg and E. W. Choe; Organometallic Polymer "Symposium on Organometallic Polymers," New Orleans, 1977, Academic Press, page 239 (1978).

However, synthesis of these polymers (1) and (2) is cumbersome because of a need for Grignard reagents or metallic sodium.

There is a need for the development of a divalent aromatic hydrocarbon group-bearing organopolysiloxane which is easy to synthesize, has improved properties (such as a high melting point), which cures into a quality article, and thus can be useful in a wide variety of industrial applications.

SUMMARY OF THE INVENTION

A primary object of the present invention is to provide a novel and improved organopolysiloxane homopolymer or copolymer having a divalent aromatic hydrocarbon group incorporated in its backbone, which has a high melting point and a high glass transition temperature, cures into products having a high modulus of elasticity and high mechanical strength, is easy to synthesize and thus suitable for use in electrical, electronic and other industries. Another object is to provide a method for preparing these polymers.

According to the present invention, there is provided an organopolysiloxane polymer comprising recurring units of the general formula:

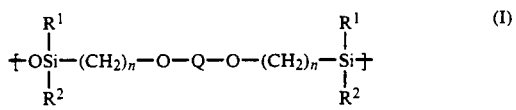

wherein $R^1$ and $R^2$ independently selected from monovalent hydrocarbon groups having 1 to 10 carbon atoms, Q is a divalent aromatic hydrocarbon group having 6 to 20 carbon atoms, and letter n is an integer of from 1 to 4. The polymer may be either a homopolymer or a copolymer. This polymer has a high melting point and a high glass transition temperature and cures into products having a high modulus of elasticity and high mechanical strength so that the polymer may find a wide variety of applications in electrical, electronic and other industries.

According to another aspect of the present invention, the polymer comprising recurring units of general formula (I) is prepared simply by reacting an alkali metal salt of a dihydroxy aromatic compound of the general formula:

$$M-O-Q-O-M \quad (1)$$

wherein M is an alkali metal atom and Q is as defined above with a halogenated alkyl diorganoalkoxysilane of the general formula:

wherein $R^1$, $R^2$, and n are as defined above, $R^3$ is a lower alkyl group, and X is a halogen atom, preferably in a polar solvent, to thereby form a bis(alkoxysilylalkoxy)arylene compound of the general formula:

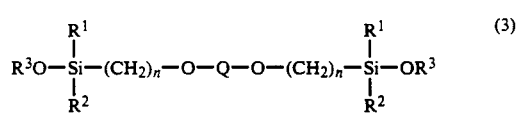

wherein $R^1$, $R^2$, $R^3$, Q, and n are as defined above, hydrolyzing the compound of formula (3) to thereby form a bis(hydroxysilylalkoxy)arylene compound of the general formula:

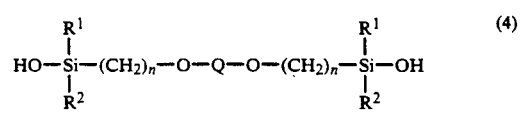

wherein $R^1$, $R^2$, $R^3$, Q, and n are as defined above, and polycondensing the compound of formula (4), preferably in the presence of a condensation catalyst.

DETAILED DESCRIPTION OF THE INVENTION

The organopolysiloxane polymer of the invention includes recurring units of general formula (I).

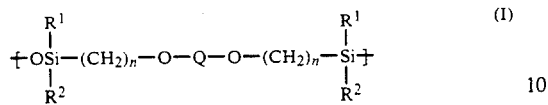
(I)

In formula (I), letter n is an integer of from 1 to 4, and $R^1$ and $R^2$ are independently selected from monovalent hydrocarbon groups having 1 to 10 carbon atoms, preferably 1 to 8 carbon atoms, for example, alkyl groups such as methyl, ethyl, propyl, and butyl, alkylene groups such as vinyl and allyl, aryl groups such as phenyl and tolyl, and aralkyl groups such as benzyl and 2-phenylethyl. Substituent Q is a divalent aromatic hydrocarbon group having 6 to 20 carbon atoms, preferably 6 to 15 carbon atoms, examples of which are illustrated below.

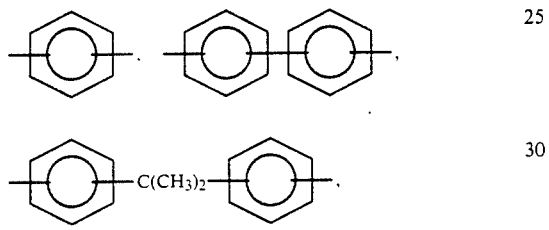

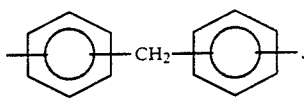

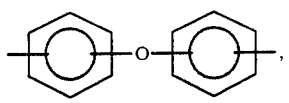

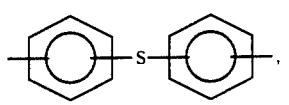

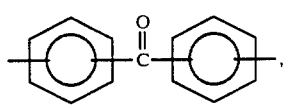

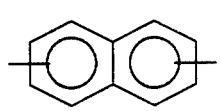

Some illustrative, non-limiting examples of the organopolysiloxane homopolymers and copolymers comprising recurring units of formula (I) are the following compounds of formulae (i) through (x). In the formulae, l and m are integers (inclusive of 0) meeting $m+l \geq 2$, preferably $m+l \geq 10$, most often $100 \leq m+l \leq 1000$.

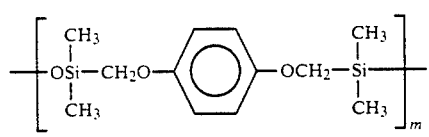
(i)

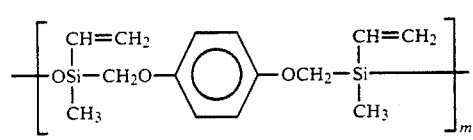
(ii)

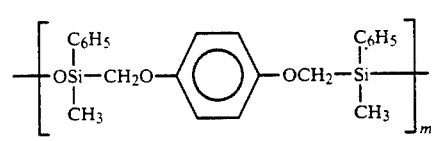
(iii)

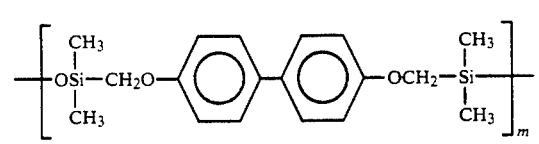
(iv)

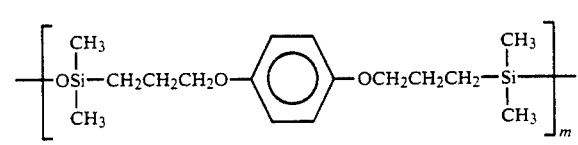
(v)

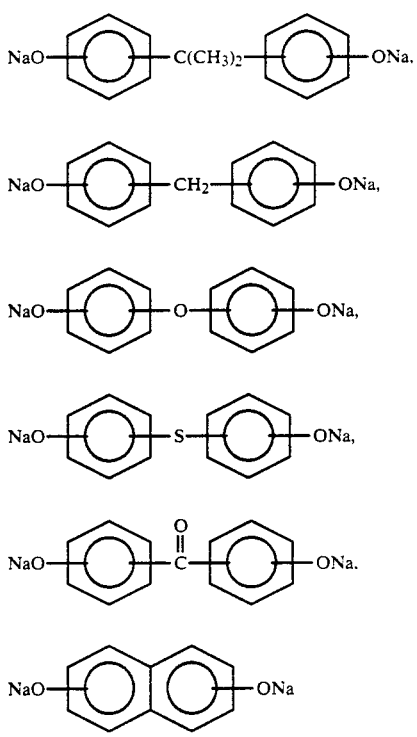

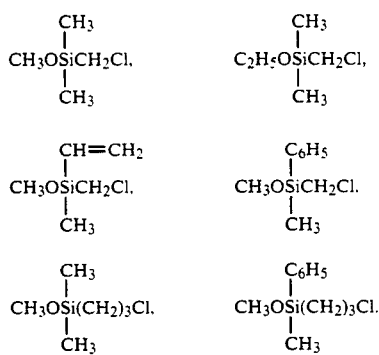

Several examples of the alkoxysilane of formula (2) are shown below.

CH₃OSi(CH₃)CH₂Cl — written as:

$$\text{CH}_3\text{O}\overset{\underset{|}{\text{CH}_3}}{\underset{|}{\text{Si}}}\text{CH}_2\text{Cl},\qquad \text{C}_2\text{H}_5\text{O}\overset{\underset{|}{\text{CH}_3}}{\underset{|}{\text{Si}}}\text{CH}_2\text{Cl},$$

$$\text{CH}_3\text{O}\overset{\underset{|}{\text{CH=CH}_2}}{\underset{|}{\text{Si}}}\text{CH}_2\text{Cl},\qquad \text{CH}_3\text{O}\overset{\underset{|}{\text{C}_6\text{H}_5}}{\underset{|}{\text{Si}}}\text{CH}_2\text{Cl},$$

$$\text{CH}_3\text{O}\overset{\underset{|}{\text{CH}_3}}{\underset{|}{\text{Si}}}(\text{CH}_2)_3\text{Cl},\qquad \text{CH}_3\text{O}\overset{\underset{|}{\text{C}_6\text{H}_5}}{\underset{|}{\text{Si}}}(\text{CH}_2)_3\text{Cl}.$$

The compound of formula (1) and the compound of formula (2) may be mixed in any desired ratio although at least two mol of the formula (2) compound is preferably used per mol of the formula (1) compound.

Reaction between the compounds of formulae (1) and (2) is often effected in a polar solvent. Examples of the solvent include dimethylsulfoxide, dimethylformamide, dimethylacetamide pyrrolidone, methylpyrrolidone, tetrahydrofuran, propyl ether, and butyl ether.

A reaction promoter may be added to the reaction charge for the purpose of promoting the reaction. The promoters include tertiary amines such as triethylamine and tributylamine; quaternary ions such as tetrabutyl ammonium bromide, benzyl triethylamine bromide, tetraphenyl phosphonium bromide, and tetrabutyl phosphonium chloride; and cyclic polyethers such as dibenzo-12-crown-4, and dibenzo-18-crown-6, dicyclohexyl-18-crown-6. The promoter is desirably added in an amount of 0.5 to 5% by weight based on the reaction charge.

The reaction conditions include a temperature of 50° to 150° C., preferably 80° to 130° C. and a time of about 8 to about 16 hours.

Reaction of the compound of formula (1) with the compound of formula (2) under the above-mentioned conditions produces a bis(alkoxysilylalkoxy)arylene compound of formula (3) wherein substituent $R^3$ is a lower alkyl group. Hydrolysis of the silicon compound of formula (3) produces a bis(hydroxysilylalkoxy)arylene compound of formula (4) having substituent $R^3$ in formula (3) replaced by a hydrogen atom.

Hydrolysis may be conventional hydrolysis for alkoxysilanes, that is, hydrolysis in a basic or acidic aqueous solution using a suitable diluent. This method has a possibility that silanol groups once formed condense in a basic or acidic condition according to the following scheme, reducing the yield of the end product.

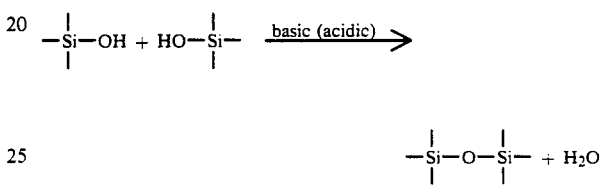

For this reason, it is recommended to effect hydrolysis by a method for the synthesis of silanols from alkoxysilanes as described in W. Bread, R. L. Elliot and M. E. White head, Journal of Polymer Science, Part A-1, Vol. 2, 2745-2755 (1967). Utilizing this method, a bis(alkoxysilylalkoxy)arylene compound of formula (3) is converted into a sodium siloxide, which is, in turn, neutralized with a phosphate buffer solution to synthesize a bis(hydroxysilylalkoxy)arylene compound of formula (4) having substituent $R^3$ in formula (3) replaced by a hydrogen atom, in high yields. The reaction scheme is as shown below.

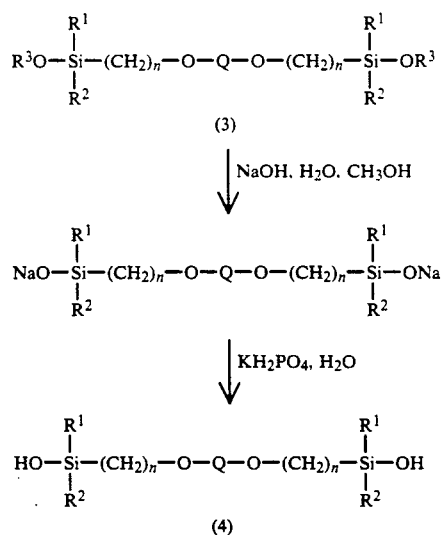

Finally, the bis(hydroxysilylalkoxy)arylene compound of formula (4) is polycondensed in the presence of a condensation catalyst to produce the end organopolysiloxane according to the present invention. Of course, two or more such compounds are polymerized when a copolymer is desired. The condensation cata- -continued

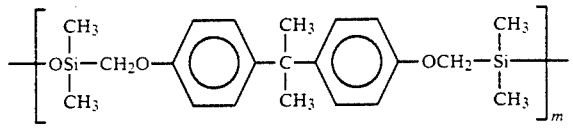
(vi)

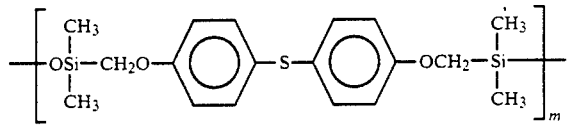
(vii)

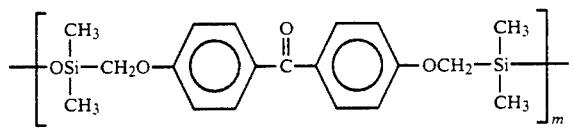
(viii)

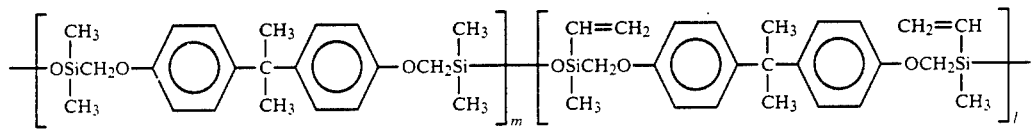
(ix)

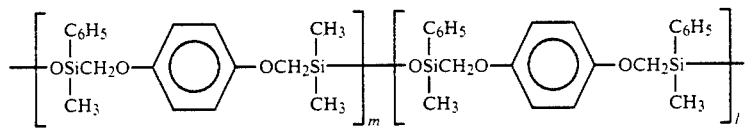
(x)

The organopolysiloxane homopolymers and copolymers of the invention which are preferred for physical properties including melting point, glass transition temperature, modulus of elasticity, and mechanical strength are those of formula (I) wherein n is equal to 1.

The organopolysiloxane polymers of the invention can be readily synthesized by the following method.

The polymer comprising recurring units of general formula (I) is prepared simply by reacting an alkali metal salt of a dihydroxy aromatic compound of the general formula:

$$M-O-Q-O-M \quad (1)$$

wherein M is an alkali metal atom such as lithium, sodium, and potassium, and Q is as defined above with a halogenated alkyl diorganoalkoxysilane of the general formula:

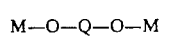
(2)

wherein $R^1$, $R^2$, and n are as defined above, $R^3$ is a lower alkyl group having 1 to 5 carbon atoms, preferably 1 to 3 carbon atoms, and X is a halogen atom such as fluorine, chlorine, bromine and iodine, in a polar solvent to thereby form a bis(alkoxysilylalkoxy)arylene compound of the general formula:

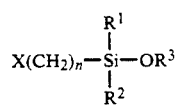
(3)

wherein $R^1$, $R^2$, $R^3$, Q, and n are as defined above, in high yields. The compound of formula (3) is then hydrolyzed to form a bis(hydroxysilylalkoxy)arylene compound of the general formula:

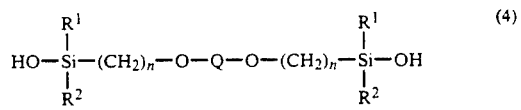
(4)

wherein $R^1$, $R^2$, $R^3$, Q, and n are as defined above, in high yields. Thereafter, one or more compounds of formula (4) are then condensed in the presence of a condensation catalyst to form an organopolysiloxane homopolymer or copolymer comprising recurring units of general formula (I).

Several examples of the alkali metal salt of a dihydroxy aromatic compound of formula (1) are shown below.

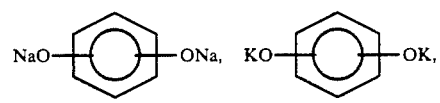

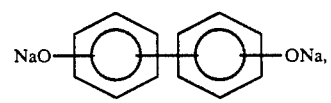

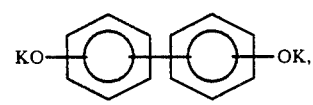

lysts used herein include n-hexylamine 2-ethylhexoate (see Rober L. Merker and Mary Jane Scot, Journal of Polymer Science, Part A, Vol. 2, 15 (1964)) and tetramethylguanidine di-2-ethylhexoate (see Rober L. Merker, Mary Jane Scot, and G. G. Haberland, Journal of Polymer Science, Part A, Vol. 2, 31 (1964)), to name a few. The reaction scheme is as shown below.

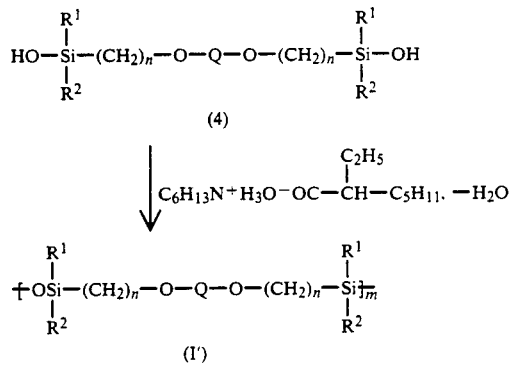

The condensation catalyst is used in a catalytic amount, typically 0.1 to 10% by weight of the reaction system.

The condensation reaction is preferably carried out in a reaction medium which azeotrops with water, for example, benzene, toluene, and xylene, so that product water may be taken out of the reaction system. In this respect, the reaction temperature is desirably higher than the azeotropic temperature of the medium with water. The reaction time usually ranges from 8 to 16 hours.

The organopolysiloxane homopolymers and copolymers prepared in this way according to the invention have a higher melting point, glass transition temperature, modulus of elasticity, and mechanical strength than currently commercially available conventional organopolysiloxanes and their cured products or elastomers. They are thus suitable for use in various industrial fields including automobile, ship, aircraft, electric and electronic fields. They are usually formed into film, fibers and various other articles.

The organopolysiloxane homopolymers and copolymers according to the invention may be combined with any desired one or more of well-known additives to further improve mechanical strength, solvent resistance or the like, depending on a particular intended purpose. Such additives include fillers such as fumed silica, precipitated silica, and calcium carbonate, coloring agents such as titanium oxide and carbon black, heat resistance modifiers, binders, and adhesives.

The organopolysiloxane homopolymers and copolymers according to the invention have a high melting point and a high glass transition temperature, cure into products having a high modulus of elasticity and high mechanical strength so that they are suitable for various industrial applications, typically in electrical and electronic industries. Ease of synthesis is another important advantage.

EXAMPLE

Examples of the present invention are given below by way of illustration and not by way of limitation. All parts and percents are by weight unless otherwise stated.

Example 1

(1) Synthesis of 2,2-bis{4'-[(dimethylmethoxysilyl)methoxy]phenyl}propane

A mixture of 114 grams (0.5 mol) of 2,2-bis(4'-hydroxyphenyl)propane (bisphenol A), 228 grams of toluene, 228 grams of dimethylsulfoxide, and 80 grams of a 50% aqueous solution of sodium hydroxide was stirred and heated at 110°–120° C. for 8 hours in a flask while azeotroping off water. There was synthesized sodium salt of bisphenol A.

The reaction solution was then cooled to 80° C., to which 145.4 grams (1.05 mol) of chloromethyldimethoxysilane was added dropwise. The mixture was stirred at 80° C. for a further 8 hours. The reaction solution was further cooled to room temperature and filtered to remove the precipitating sodium chloride. Vacuum distillation of the filtrate afforded 130 grams (yield 60%) of a white solid as a fraction at a boiling point of 205° C./1 mmHg.

This solid had the following physical properties and was identified to be 2,2-bis{4'-[(dimethylmethoxysilyl)methoxy]phenyl}propane of the following structural formula.

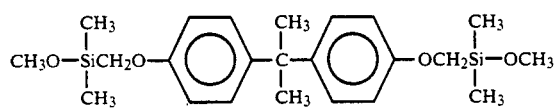

Melting point: 106° C.
$^1$H—NMR (CCl$_4$): δ (ppm)
0.15 (Si—CH$_3$, S, 12H), 1.53 (C—CH$_3$, S, 6H),
3.25 (SiOCH$_3$, S, 6H), 3.31 (Si—CH$_2$—, S, 4H)
MS: m/e=432

(2) Synthesis of 2,2-bis{4'-[(dimethylhydroxysilyl)methoxy]phenyl}propane

A flask was charged with 18.2 grams of sodium hydroxide, 12.6 grams of water, and 84 ml of methanol. A solution of 50 grams (0.116 mol) of 2,2-bis{4'-[(dimethylmethoxysilyl)methoxy]phenyl}propane resulting from step (1) in 60 ml of tetrahydrofuran and 60 ml of ethanol was added dropwise to the flask at room temperature. The mixture was stirred for one hour.

To the solution was added a solution of 18.2 grams of sodium hydroxide in 84 ml of water. The mixture was stirred for one hour. The solution was added dropwise to a solution of 132.5 grams of potassium dihydrogen phosphate in 2100 grams of ice water and the mixture was allowed to stand for one day. The resulting solid was filtered, dried in vacuum, and recrystallized from toluene, obtaining 40.8 grams (yield 87%) of white crystals.

This solid had the following physical properties and was identified to be 2,2-bis{4'-[(dimethylhydroxysilyl)methoxy]phenyl}propane of the following structural formula.

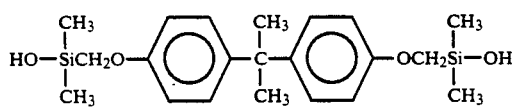

Melting point: 106° C.
Elemental analysis: C$_{21}$H$_{32}$Si$_2$O$_4$

| | C | H | Si |
|---|---|---|---|
| Calc. | 62.32 | 7.99 | 13.88 |
| Found | 62.41 | 7.92 | 13.69 |

$^1$H—NMR (CD$_3$COCD$_3$): δ (ppm)
−0.12 (Si—CH$_3$, S, 12H), 1.25 (C—CH$_3$, S, 6H),
3.13 (Si—CH$_2$—, S, 4.3H), 4.63 (O—H, S, 2H),
6.38-6.83 (φH, m, 8.4H)
IR (KBr): Vmax
3340 cm$^{-1}$ (O—H), 2960 cm$^{-1}$ (C—H)

(3) Polymerization of 2,2-bis{4'-[(dimethylhydroxysilyl)methoxy]phenyl}propane

A flask was charged with 20 grams of 2,2-bis{4'-[(dimethylhydroxysilyl)methoxy]phenyl}propane resulting from (2), 40 grams of toluene, and 0.2 grams of n-hexylamine 2-ethylhexoate. The contents were stirred for 12 hours at a temperature of 120°-140° C. while azeotroping off water.

The solution was then cooled to room temperature and added in increments to 1000 ml of methanol with vigorous stirring, causing the resultant polymer to precipitate again. The polymer was collected by filtration and dried in vacuum, obtaining 17.8 grams of a white solid.

The molecular weight of this solid was measured by means of a gel permeation chromatograph (GPC) model HLC-8020 (manufactured by Toyo Soda K.K.) loaded with a polystyrene gel column, finding a weight average molecular weight (Mw) of 164,000 and a number average molecular weight (Mn) of 60,700. Using a differential thermobalance model TA-3000 (manufactured by Metra Co.), it was also measured for melting point (Tm) and glass transition temperature (Tg), which were 93° C. and 37° C., respectively.

This solid was dissolved in tetrahydrofuran to form a 20% solution, which was cast into a mold where the solvent was evaporated off to form a film of about 200 μm thick. The film was measured for modulus in tension and tensile strength by means of a tensile tester.

Modulus in tension (modulus at 1.25% elongation): 145 kg/mn$^2$
@25° C., gage mark span 25 mm, pulling rate 1 mm/min.
Tensile strength: 1.47 kg/mm$^2$
@25° C., gage mark span 25 mm, pulling rate 50 mm/min.

Example 2

(1) Synthesis of 4,4'-bis[(dimethylmethoxysilyl)methoxy]benzophenone

A reaction procedure similar to step (1) of Example 1 was followed using 107 grams (0.5 mol) of 4,4'-dihydroxybenzophenone, 214 grams of toluene, 214 grams of dimethylsulfoxide, 80 grams of a 50% aqueous solution of sodium hydroxide, and 145.5 grams (1.05 mol) of chloromethyldimethoxysilane. Vacuum distillation afforded 86 grams (yield 41%) of a pale yellow solid as a fraction at a boiling point of 286°-288° C./1 mmHg.

This solid had the following physical properties and was identified to be 4,4'-bis[(dimethylmethoxysilyl)methoxy]benzophenone of the following structural formula.

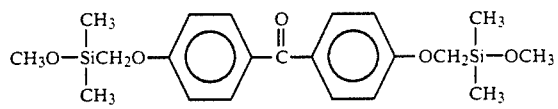

Melting point: 52° C.
$^1$H—NMR (CCl$_4$): δ (ppm)
0.1 (Si—CH$_3$, S, 12H), 3.33 (SiOCH$_3$, S, 6H),
3.52 (Si—CH$_2$—, S, 4H), 6.85-7.60 (φH, m, 8H)
MS: m/e=418

(2) Synthesis of 4,4'-bis[(dimethylhydroxysilyl)methoxy]benzophenone

A reaction procedure similar to step (2) of Example 1 was followed using 18.8 grams of sodium hydroxide, 13 grams of water, 86 ml of methanol, 50 grams (0.12 mol) of 4,4'-bis[(dimethylmethoxysilyl)methoxy]benzophenone resulting from step (1), 120 ml of ethanol, 18.8 grams of sodium hydroxide, 86 ml of water, 137 grams of potassium dihydrogen phosphate, and 2,200 grams of ice water. Recrystallization from toluene gave 28.8 grams (yield 61%) of pale yellow crystals.

This solid had the following physical properties and was identified to be 4,4'-bis[(dimethylhydroxysilyl)methoxy]benzophenone of the following structural formula.

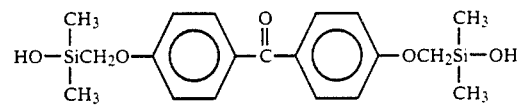

Melting point: 126° C.
Elemental analysis: C$_{19}$H$_{26}$Si$_2$O$_5$

| | C | H | Si |
|---|---|---|---|
| Calc. | 57.97 | 6.67 | 15.03 |
| Found | 58.18 | 6.83 | 14.90 |

$^1$H—NMR (CD$_3$COCD$_3$): δ (ppm)
−0.3 (Si—CH$_3$, S, 12H), 3.17 (Si—CH$_2$—, S, 3H),
4.47 (OH, S, 1.9H), 6.43-7.27 (φH, m, 8.3H)
IR (KBr): Vmax
3250 cm$^{-1}$ (O—H), 2960 cm$^{-1}$ (C—H)

(3) Polymerization of 4,4'-bis[(dimethylhydroxysilyl)methoxy]benzophenone

A reaction procedure similar to step (3) of Example 1 was followed using 20 grams of 4,4'-bis[(dimethylhydroxysilyl)methoxy]benzophenone resulting from (2), 40 grams of toluene, and 0.2 grams of n-hexylamine 2-ethylhexoate. There was obtained 17.3 grams of a pale yellow solid. Similarly, this solid were measured for physical properties.
Mw: 86,600
Mn: 38,000
Tm: 92° C.
Tg: 44° C.
Modulus in tension: 155 kg/mm$^2$
Tensile strength: 3.18 kg/mm$^2$

Example 3

(1) Synthesis of 2,2-bis{4'-[(vinylmethylmethoxysilyl)methoxy]phenyl}propane

A reaction procedure similar to step (1) of Example 1 was followed using 114 grams (0.5 mol) of 2,2-bis(4'-hydroxyphenyl)propane (bisphenol A), 228 grams of toluene, 228 grams of dimethylsulfoxide, 80 grams of a 50% aqueous solution of sodium hydroxide, and 158.0 grams (1.05 mol) of chloromethylvinylmethylmethoxysilane. Vacuum distillation afforded 98 grams (yield 43%) of a white solid as a fraction at a boiling point of 240°-243° C./1 mmHg.

This solid had the following physical properties and was identified to be 2,2-bis{4'-[(vinylmethylmethoxysilyl)methoxy]phenyl}propane of the following structural formula.

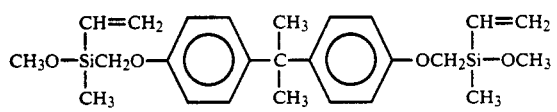

Melting point: 87° C.
$^1$H—NMR (CCl$_4$): δ (ppm)
0.23 (Si—CH$_3$, S, 6H), 1.55 (C—CH$_3$, S, 6H),
3.45 (SiOCH$_3$, S, 6H), 3.55 (Si—CH$_2$—, S, 4H),
5.66-6.25 (Si—CH=CH$_2$, m, 6H),
6.6-7.1 (φH, m, 8H)
MS: m/e=456

(2) Synthesis of 2,2-bis{4'-[(vinylmethylhydroxysilyl)methoxy]phenyl}propane

A reaction procedure similar to step (2) of Example 1 was followed using 17.2 grams of sodium hydroxide, 11.9 grams of water, 86 ml of methanol, 50 grams (0.11 mol) of 2,2-bis{4'-[(vinylmethylmethoxysilyl)methoxy]phenyl}propane resulting from step (1), 60 ml of tetrahydrofuran, 60 ml of ethanol, 17.2 grams of sodium hydroxide, 80 ml of water, 125.2 grams of potassium dihydrogen phosphate, and 1,980 grams of ice water. Recrystallization from toluene gave 38.6 grams (yield 82%) of white crystals.

This solid had the following physical properties and was identified to be 2,2-bis{4'-[(vinylmethylhydroxysilyl)methoxy]phenyl}propane of the following structural formula.

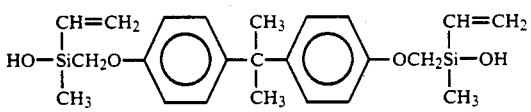

Melting point: 108° C.
Elemental analysis: C$_{23}$H$_{32}$Si$_2$O$_4$

|  | C | H | Si |
|---|---|---|---|
| Calc. | 64.44 | 7.53 | 13.10 |
| Found | 64.52 | 7.47 | 13.01 |

$^1$H—NMR (CD$_3$COCD$_3$): δ (ppm)
−0.13 (Si—CH$_3$, S, 6H), 1.17 (C—CH$_3$, S, 6H),
3.23 (Si—CH$_2$—, S, 4.2H), 4.73 (O—H, S, 2H),
5.56-6.0 (Si—CH=CH$_2$, m, 6.1H),
6.36-6.8 (φH, m, 8.2H)
IR (KBr): Vmax
3340 cm$^{-1}$ (O—H), 2960 cm$^{-1}$ (C—H)

(3) Copolymerization of 2,2-bis{4'-[(dimethylhydroxysilyl)methoxy]phenyl}propane with 2,2-bis[4'-[(vinylmethylhydroxysilyl)methoxy]phenyl}propane A reaction procedure similar to step (3) of Example 1 was followed using 40.4 grams (0.1 mol) of 2,2-bis{4'-[(dimethylhydroxysilyl)methoxy]phenyl}propane resulting from step (2) of Example 1, 0.856 grams (0.002 mol) of 2,2-bis{4'-[(vinylmethylhydroxysilyl)methoxy]phenyl}propane resulting from step (2) of this example, 96 grams of toluene, and 0.4 grams of n-hexylamine 2-ethylhexoate. There was obtained 32 grams of a white solid. Similarly, this solid were measured for physical properties.

Mw: 159,600
Mn: 74,600
Tg: 29° C.
Modulus in tension: 32 kg/mm$^2$
Tensile strength: 1.1 kg/mm$^2$ Example 4

(1) Synthesis of p-bis[(methylphenylmethoxysilyl)methoxy]benzene

A reaction procedure similar to step (1) of Example 1 was followed using 55.0 grams (0.5 mol) of hydroquinone, 110 grams of toluene, 110 grams of dimethylsulfoxide, 80 grams of a 50% aqueous solution of sodium hydroxide, and 210.5 grams (1.05 mol) of chloromethylphenylmethylmethoxysilane. Vacuum distillation afforded 140 grams (yield 32%) of a clear colorless liquid as a fraction at 217°-218° C./0.8 mmHg.

This liquid had the following physical properties and was identified to be p-bis[(methylphenylmethoxysilyl)methoxy]benzene of the following structural formula.

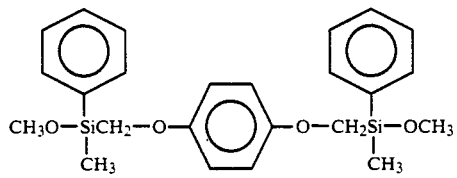

Specific gravity: 1.1043 @25° C.
Refractive index (n$^{25}_D$): 1.5541
$^1$H—NMR (CCl$_4$): δ (ppm)
0.27 (Si—CH$_3$, S, 6H), 3.27 (SiOCH$_3$, S, 5.8H),
3.5 (Si—CH$_2$, S, 4.1H), 6.5-7.4 (φH, m, 13.9H)
MS: m/e=438

(2) Synthesis of p-bis[(methylphenylhydroxysilyl)methoxy]benzene

A reaction procedure similar to step (2) of Example 1 was followed using 17.9 grams of sodium hydroxide, 12.4 grams of water, 82 ml of methanol, 50 grams (0.11 mol) of p-bis[(methylphenylmethoxysilyl)methoxy]benzene resulting from step (1), 120 ml of ethanol, 17.9 grams of sodium hydroxide, 82 ml of water, 125.2 grams of potassium dihydrogen phosphate, and 2,100 grams of ice water. There was obtained a clear colorless viscous liquid. This liquid was dissolved in 200 ml of toluene, washed a few times with water, dried over anhydrous sodium sulfate, heated to 150° C., and vacuum stripped at the temperature, obtaining 38 grams of a clear colorless viscous liquid.

This liquid was measured for infrared absorption spectrum and NMR spectrum and was identified to have the following structural formula.

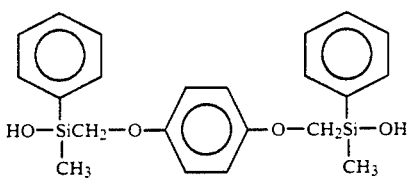

IR (KBr): Vmax
3325 cm$^{-1}$ (O—H)
$^1$H—NMR (CD$_3$COCD$_3$): δ (ppm)
−0.07 (SiCH$_3$, S, 6H), 3.26 (SiCH$_2$, S, 4.1H),
4.8 (SiOH, S, 3.8H), 6.31-7.23 (φH, m, 14.3H)

(3) Polymerization of p-bis[(methylphenylhydroxysilyl)methoxy]benzene

A reaction procedure similar to step (3) of Example 1 was followed using 20 grams of p-bis[(methylphenylhydroxysilyl)methoxy]benzene resulting from (2), 40 grams of toluene, and 0.2 grams of n-hexylamine 2-ethylhexoate. There was obtained 16.8 grams of a white solid. Similarly, this solid were measured for physical properties.

Mw: 26,400
Mn: 12,900
Tg: 28° C.
Modulus in tension: 4.5 kg/mm$^2$
Tensile strength: 1.15 kg/mm$^2$ Several preferred embodiments have been described. Obviously many modifications and variations of the present invention are possible in the light of the above teachings. It is therefore to be understood that within the scope of the appended claims, the invention may be practiced otherwise than as specifically described.

I claim:

1. An organopolysiloxane polymer comprising recurring units of the general formula:

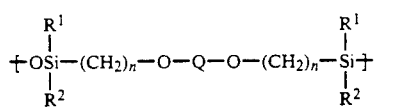

wherein R$^1$ and R$^2$ are independently selected from monovalent hydrocarbon groups having 1 to 10 carbon atoms, Q is a divalent aromatic hydrocarbon group having 6 to 20 carbon atoms, and letter n is an integer of from 1 to 4.

2. The polymer of claim 1 which is a homopolymer.
3. The polymer of claim 1 which is a copolymer.
4. The polymer of claim 1 wherein in formula (I), R$^1$ and R$^2$ are independently selected from the class consisting of methyl, vinyl, and phenyl groups, and Q is selected from the class consisting of

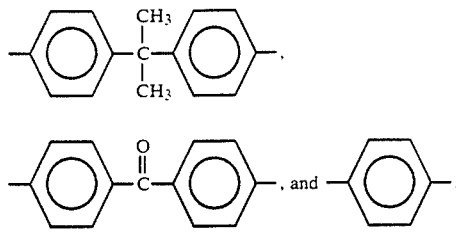

5. A method for preparing a polymer comprising recurring units of the general formula:

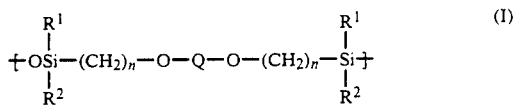

wherein R$^1$ and R$^2$ are independently selected from monovalent hydrocarbon groups having 1 to 10 carbon atoms, Q is a divalent aromatic hydrocarbon group having 6 to 20 carbon atoms, and letter n is an integer of from 1 to 4, said method comprising the steps of:

reacting an alkali metal salt of a dihydroxy aromatic compound of the general formula:

$$M-O-Q-O-M \qquad (1)$$

wherein M is an alkali metal atom and Q is as defined above with a halogenated alkyl diorganoalkoxysilane of the general formula:

wherein R$^1$, R$^2$, and n are as defined above, R$^3$ is a lower alkyl group having 1 to 5 carbon atoms, and X is a halogen atom, to thereby form a bis(alkoxysilylalkoxy)arylene compound of the general formula:

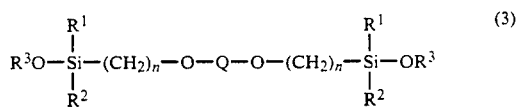

wherein R$^1$, R$^2$, R$^3$, Q, and n are as defined above, hydrolyzing the compound of formula (3) to thereby form a bis(hydroxysilylalkoxy)arylene compound of the general formula:

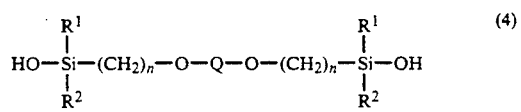

wherein R$^1$, R$^2$, R3, Q, and n are as defined above, and
polycondensing the compound of formula (4).

* * * * *